(12) United States Patent
Platon et al.

(10) Patent No.: US 7,231,814 B2
(45) Date of Patent: Jun. 19, 2007

(54) MOISTURE MEASURING DEVICE AND METHOD

(75) Inventors: Günter Platon, Klein Denkte (DE); Christoph Ramm, Braunschweig (DE); Kord Hinrich Lühr, Wolfenbüttel (DE)

(73) Assignee: Lely Enterprises AG, Zug (CH)

( * ) Notice: Subject to any disclaimer, the term of this patent is extended or adjusted under 35 U.S.C. 154(b) by 165 days.

(21) Appl. No.: 10/995,139

(22) Filed: Nov. 24, 2004

(65) Prior Publication Data
US 2005/0115309 A1 Jun. 2, 2005

(30) Foreign Application Priority Data
Nov. 28, 2003 (EP) .................................. 03078767

(51) Int. Cl.
*G01N 25/56* (2006.01)
(52) U.S. Cl. .................... 73/73; 56/10.2 B; 56/10.2 R; 460/7
(58) Field of Classification Search .................... 73/73; 460/7; 56/51, 500, 10.2 B, 10.2 R
See application file for complete search history.

(56) References Cited

U.S. PATENT DOCUMENTS

| | | | | |
|---|---|---|---|---|
| 6,101,932 | A * | 8/2000 | Wilkens ........................ | 100/41 |
| 6,185,990 | B1 * | 2/2001 | Missotten et al. ............. | 73/73 |
| 6,389,884 | B1 * | 5/2002 | Diekhans et al. .............. | 73/73 |
| 6,401,549 | B1 * | 6/2002 | Ohlemeyer ............... | 73/861.73 |
| 2002/0073770 | A1 * | 6/2002 | Diekhans et al. .............. | 73/73 |
| 2002/0187819 | A1 * | 12/2002 | Shinners et al. ............... | 460/6 |
| 2003/0004630 | A1 * | 1/2003 | Beck ............................ | 701/50 |

FOREIGN PATENT DOCUMENTS

| | | |
|---|---|---|
| DE | 2303109 | 7/1974 |
| DE | 3232746 A1 | 3/1984 |
| DE | 19959117 A1 | 7/2001 |
| DE | 10204941 A1 | 8/2003 |
| EP | 468023 B1 | 10/1995 |
| EP | 0843959 A1 | 5/1998 |
| EP | 0960557 A1 | 12/1999 |
| SU | 1103124 A * | 7/1984 |

OTHER PUBLICATIONS

European Search Report patent No. EP 03 07 87 67.

* cited by examiner

*Primary Examiner*—Hezron Williams
*Assistant Examiner*—Tamiko Bellamy
(74) *Attorney, Agent, or Firm*—David P. Owen; Howrey LLP

(57) ABSTRACT

The invention relates to a measuring device for the measurement of properties of a material to be measured, in particular of the moisture content of agricultural harvested products such as hay, straw, or wilted silage, with a moisture sensor element (22, 49, 54, 62, 65) and at least one further sensor element for the detection of other material properties. In order to improve the measuring device it is proposed according to the invention that the further sensor element (23, 50, 58, 64, 66) is suitable for the measurement of the compression force exerted by the material to be measured on the moisture sensor element (22, 49, 54, 62, 65), or of a force corresponding to this compression force at another measuring point. In the measuring method according to the invention, the simultaneous measurement of the raw moisture value Qr and compression force F results in value pairs from which actual moisture values Q can be derived with a high degree of precision by means of a calibration surface (47), in a simple manner from the point of view of measurement technology.

29 Claims, 5 Drawing Sheets

MOISTURE MEASURING DEVICE AND METHOD

CROSS REFERENCE TO RELATED APPLICATIONS

This application claims priority from European application number EP03078767.5 filed on 28 Nov. 2004, the contents of which are hereby incorporated by reference in their entirety.

BACKGROUND OF THE INVENTION

1. Field of the Invention

The invention relates to a measuring device for the measurement of properties of a material to be measured, in particular of the moisture content of agricultural harvested products such as hay, straw, or wilted silage, with a moisture sensor element and at least one further sensor element for the detection of other material properties. The invention further relates to a method for measuring properties of a material to be measured in a measuring device.

2. Description of the Related Art

Both for the obtaining of high-quality animal feed as well as for its utilisation, such as in feed mixing vehicles, a precise knowledge of the moisture content or of the dry mass of the feed is of decisive significance. Despite decades of development work, it has not yet proved possible for a moisture-measuring device to be created for compactable stalk or stem products which will fulfill the requirements for the precision of measurement at economically viable costs.

The problem lies in the fact that, with a constant assumed mass volume of a compactable stalk or stem product (such as wilted grass), the proportions of air and water to the dry mass vary very sharply as a function of the compaction. The consequence of this is that, for example, certain measuring devices measure highly-compacted material to be measured as being too moist.

A device is also known from German patent application DE 32 32 746 A1 in which a harvesting machine is provided with a meter for determining the amount of product entering the harvesting machine. The meter comprises pivoted feelers that move in response to the through flow of product. The feelers are connected to potentiometers which determine the angular extent by which the feelers pivot. The tips of the feelers in contact with the product may also be provided with electrodes for measuring moisture content. Since the feelers are biased against the product, improved contact is thus achieved between the product and the electrode.

In order to exclude the influence of different material densities, it has also been proposed that the material be measured in a state of as constant density as possible. As a result, the measuring points in an agricultural harvesting machine and the scope of application are severely restricted, because in practice measurement can be taken only on compacted bales or at the intake point of the material into the compression chamber of a variable round bale press. Basically, however, the disadvantage pertains that a constant and continuous pressure cannot be achieved at all at the measuring point because of the fluctuating material infeed over the height and width of the infeed aperture. The consequence of this is relatively imprecise measured values of this moisture-measuring device. Devices of this type are disclosed in German patent applications DE 23 03 109 A, DE 199 59 117 A1, and DE 102 04 941 A1.

From EP 0 843 959 A1 a measuring device is known in an agricultural machine with a microwave sensor. The moisture of the stationary or moving harvested material in the machine is intended to be determined by assessment of the damping of specific frequencies. A further method for the measurement of the material moisture of a material to be measured with the aid of microwaves is known from EP 0 468 023 B1. In this situation, it is intended that a measurement of the moisture values regardless of the density should be possible by an evaluation of the microwave signals. It is intended that the displacement should be determined of the resonance frequency of a resonator, caused by the moist mass. This method is suitable for relatively homogenous materials such as tobacco, coffee, marzipan, cheese, or similar materials. Measuring devices of this kind have to date not developed beyond the experimental stage, at least with regard to bale presses for agricultural stalk or stem materials. On the one hand, these measuring devices are very expensive and fall within the range of the costs of the machine in which they are to be used, such as a round bale press. On the other, these measuring devices are designed more for laboratory operation and stationary production processes. The main reason, however, lies in the fact that the precision of measurement for very inhomogeneous stem or stalk materials such as straw, hay, grass, or clover can only be represented by precise calibrations.

Thus, there is a particular need for an improved moisture measurement device that can meet the above-mentioned requirements of accuracy and cost.

BRIEF SUMMARY OF THE INVENTION

According to the invention there is provided a measuring device for the measurement of properties of a material to be measured, in particular the moisture content of agricultural harvested materials such as hay, straw, or wilted silage, the measuring device comprising: a moisture sensor element for measuring a raw moisture value (Qr) of the material; and a force sensor element for measuring a compression force (F) exerted by the material on the moisture sensor element or a force corresponding to this compression force at another measuring point.

By means of the combination according to the invention of the measurement of the moisture content with the ongoing measurement of the compression force of the material to be measured, changes in the compaction of the mass material are no longer of any consequence. The measuring point is therefore no longer specified by the measurement method, but can be selected in such a way as is most suitable for the desired measurement result. The measurement of the compression force is possible with only a small amount of effort, and is the easiest means of representing a measure for the density of the material to be measured. In this situation it is significant that the density of the material to be measured is not measured as an absolute value, and frequently is not even measurable at all, because no mass volume can be precisely defined. In the method according to the invention, the simultaneous measurement of raw moisture values and compression force results in value pairs from which actual moisture values can be derived with a high degree of precision in a simple manner from the point of view of technical measurement.

One simple embodiment in terms of structure and design is attained if the moisture sensor element is supported on the force sensor. In this way, moisture measurement signals and compression force measurement signals are automatically received simultaneously and directly, without falsification. A further advantage lies in the use of standard measurement recorders. Alternatively, the force sensor element may be arranged as a force-sensitive surface on the moisture sensor element.

According to another embodiment, the force sensor may be arranged separately from the moisture sensor element at a measuring point with the same compression conditions as those of the material to be measured at the moisture sensor.

Because very large proportions of air or air enclosures in the material to be measured, such as, for example, with relatively loose swaths which have just been taken up, could falsify the measurement result with certain moisture sensors, it is proposed, in a further embodiment of the invention, that the material to be measured is pressed and compacted by at least one compression device with additional force directly or indirectly onto the moisture sensor element. In this situation the compression device may comprise a pressing plate, a pressing roller, and/or a press rake, in the nature of a pick-up hold-down device. The moisture sensor element itself may be designed as a compression device for the material to be measured e.g. by arranging it to be movable. Alternatively, the compression device may comprise compression teeth and the force sensor measures the compression force of the compression teeth on the material to be measured.

The compression device may be arranged to exert a largely constant pressure on the material to be measured or may be controlled to vary the compression force according e.g. to the requirements of the material being harvested.

Preferably the measuring device is provided with a control unit that may be operationally connected to the moisture sensor element and the force sensor element for determining the actual moisture value on the basis of the raw moisture value and the compression force.

According to a further aspect of the present invention, there is provided a mobile agricultural harvesting machine such as a bale press, forage harvester, combine harvester, mowing machine or haymaking machine comprising: a path for harvested material; a moisture sensor element located in the path; at least one force sensor element for measuring a compression force exerted by the harvested material on the moisture sensor element or a force corresponding to this compression force at another measuring point; and a control unit operationally connected to the moisture sensor element and the force sensor element for determining an actual moisture content of the harvested material on the basis of the raw moisture value and the compression force.

Preferably, the moisture sensor element is arranged in a conveying channel located downstream of a pick-up drum of the machine. As a result of this, the material to be measured can be constantly measured, and as early as possible, in order, as a function of measured parameters, for example, for the addition of preservation means to be regulated.

In one embodiment the mobile agricultural harvesting machine is a round bale press and the moisture sensor element is arranged in an area of a compression chamber.

Alternatively, the mobile agricultural harvesting machine is a ram extruder press and the moisture sensor element is arranged in an area of a preliminary compression channel or a compression channel of the ram extruder press.

According to a desirable embodiment of a ram extruder press according to the invention, a compression force sensor element may be combined directly or indirectly with a pressure or density sensor in a preliminary compression channel of the ram extruder press, or may be arranged in its immediate vicinity.

Preferably, the sensor elements of the mobile agricultural harvesting machine are in operational connection with a control unit, which has at least one display for the moisture content of the material to be measured. The control unit may have at least one memory with at least one multi-dimensional calibration function or calibration surface for the allocation of measured value pairs of the raw moisture value (Qr) and force (F) to form a calibrated moisture measured value (Q). The control unit may also be operationally connected to control certain operations of the machine on the basis of the actual moisture content.

According to a further embodiment, for different types or structures of harvested material, such as straw, hay, alfalfa, silage, or maize straw, different calibration functions are stored, which can be pre-selected manually via a man-machine interface or via a further material type sensor or which are accessible automatically.

Preferably, the control unit excludes signals from the moisture sensor element below a predetermined force measurement value of the force sensor element, so that it can also be identified whether material to be measured is located in the measurement range of the moisture sensor or not. Predetermined force measured values are therefore necessary, since below a particular density of a material no unambiguous allocation of the moisture measured values to the force measured values is possible. In addition to this, additional devices can be done away with, such as light barriers, vibration sensors, or similar devices which detect whether harvested material is running through the machine or not, and, for example switch off the measurement electronics on the headland, because no material is being introduced. Furthermore, the control unit may automatically evaluate sensor signals to determine if predetermined force measurement values of the force sensor element are reached or exceeded.

According to a further embodiment, the compression force on the material to be measured can be controlled or regulated as a function of the material properties of the material to be measured or as a function of the compression force measured by a sensor, or can be predetermined by the operator.

According to a still further alternative embodiment, the measuring device could be a mobile hand-held measuring device with its own power supply. Such a device could be pressed against a sample of material for determining its moisture content.

The moisture sensor element itself may operate in accordance with known moisture measurement processes such as conductivity measurement, capacitive measurement, or according to the microwave measurement method. Use is preferably made of a capacitive moisture sensor which has a simple measurement principle, is easy to handle, and has a high level of measurement precision. Moisture sensors can also be used which operate according to the microwave method. These, however, require the knowledge of a microwave specialist, because the microwave measurement method is very complicated and cost-intensive.

The invention also relates to a method for determining the actual moisture content of a material to be measured, the method comprising: measuring a raw moisture value (Qr) of the material to be measured; measuring a compression force (F) of the material to be measured; evaluating the actual moisture content (Q) of the material on the basis of the raw moisture value and the compression force.

The method according to the invention can be realised in a simple manner, wherein the actual moisture content is evaluated by means of a multi-dimensional calibration function of raw moisture data and compression data. The calibration surface may consist of measured raw moisture values, between which measured values calculated values are determined e.g. by extrapolation. In this way, with relatively few calibrations, a sufficiently precise calibration surface in the desired moisture range can be represented.

In a further embodiment of the method, provision is made, in the establishment of the calibration surface, for value pairs to be allocated to a known moisture content value of the material to be measured, consisting of the raw moisture value measured with the moisture sensor and the compression force value measured with the force sensor. The measurement method is transparent and is neither time-intensive nor cost-intensive. For the establishment of the calibration surface, a number of material samples are taken in each case in the range from minimum to maximum moisture. Each material sample is then compressed with different forces and, in this situation, in each case a raw moisture value is measured, from which a raw moisture value calibration curve is derived as a function of the compression force, to which the actual moisture value is then allocated by means of drying cabinet measurement of the samples.

Preferably, the raw moisture value and the compression value are measured simultaneously.

BRIEF DESCRIPTION OF THE DRAWINGS

The features and advantages of the invention will be appreciated upon reference to the following drawings of a number of exemplary embodiments, in which.

DESCRIPTION OF ILLUSTRATIVE EMBODIMENTS

Figure 1:
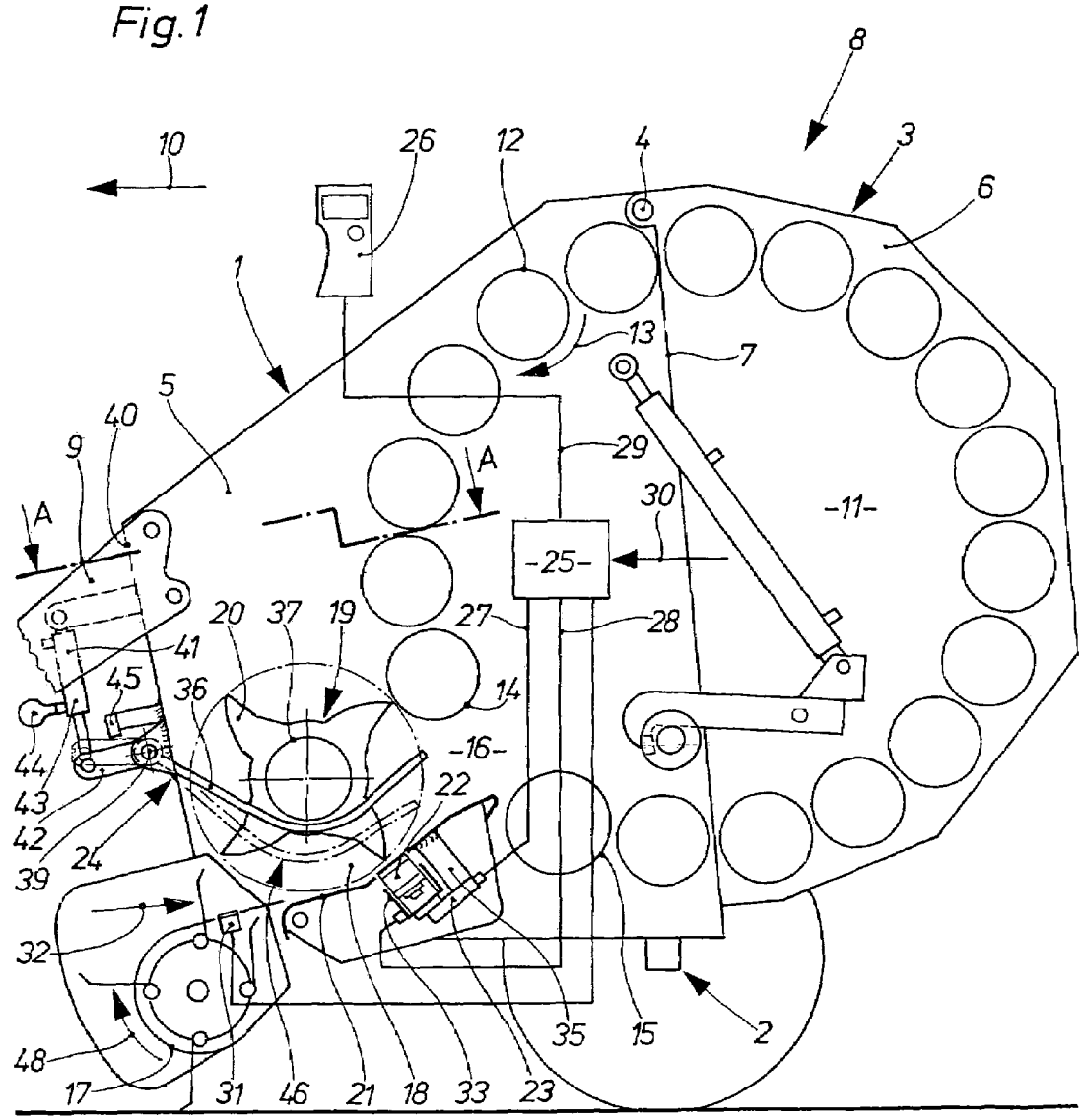
FIG. 1 is a diagrammatic side view of a round bale press with a measuring device according to the invention.

The following is a description of certain embodiments of the invention, given by way of example only and with reference to the drawings. The round bale press represented in FIG. 1 has a two-part compression chamber housing, consisting of a front housing 1, which rests on a fixed frame on a chassis 2, and a rear housing 3, which, after the forming of a bale, can be folded up about a horizontal upper pivot axis 4 for the ejection of the bale into an offloading position.

The front housing 1 has two side walls 5, which are connected to one another by means of transverse connection elements. The rear housing 3 has two side walls 6. These are located with a front edge 7 in the closed position 8 at the side walls 5 of the front housing 1. A tension element 9 engages at the front housing 1 for connecting to a tractor, not shown, which draws the round bale press over the field in the direction of the arrow 10.

In the compression chamber housing a compression chamber 11 is formed, which in this embodiment has a constant diameter or can also have a variable compression chamber diameter. The compression chamber 11 is delimited on the circumference side by rotating, drivable compression elements, which in this embodiment are compression rollers 12 mounted in the side walls 5, 6, but which can also be formed by belts, bar chain conveyors, or combinations thereof. The common direction of rotation of the compression rollers 12 is indicated by the arrow 13.

A delivery aperture 16 for stem or stalk material is left free between a compression roller 14 and a base compression roller 15. The stem or stalk material lying in swathes on the ground is taken up by means of a pick-up drum 17 and conveyed through a conveying channel 18 and through the delivery aperture 16 into the compression chamber 11. The conveying channel 18 is delimited in the upward direction by a conveying rotor 19, which exhibits on its circumference conveying teeth 20, arranged at a distance interval from one another. In the downward direction the conveying channel 18 is delimited by a conveying channel base 21. The conveying channel base 21 is designed in the form of a sheet metal plate folded slightly downwards, which extends from the compression roller 15 as far as the pick-up drum 17.

The conveying channel base 21 may have, not represented here, longitudinal aperture slots arranged next to one another in the sheet metal plate, through which the cutting blades engage, which, in their cutting position pivoted into the conveying channel 18, form a cutting assembly together with the conveying rotor 19.

A novelty is a measuring device for the moisture content of the stem and stalk material taken up. The measuring device of this embodiment consists essentially of five components, which can best be seen from FIGS. 1 and 2:

A moisture sensor 22, arranged in the conveying channel base 21, such as, for example, a capacitive moisture probe, A compression force sensor 23, on which the moisture sensor 22 is supported, A compression device 24 with compression teeth 36, which presses the stem or stalk material onto the moisture sensor 22 with a predetermined force, A control unit 25 with suitable microprocessor control for the input, processing, and output of data, and A man-machine interface 26, such as, for example, an operating device with keyboard and display.

The components are in operating connection by means of appropriate lines 27, 28, 29, and receive their energy supply from, for example, the tractor.

Specific materials and/or material structures may make it necessary for additional influence to be effected on the values determined. This influence (correction) can be effected by manual input at the operating device 26 or at the control unit 25, see arrow 30, or automatically by means of a material type sensor 31, which is designed for specific material properties, and which is arranged upstream of the moisture sensor 22 in the direction of the material flow, behind the circulation path of the pick-up drum 17.

The individual components are described in greater detail hereinafter:

The moisture sensor 22 is arranged beneath the conveyor rotor 19 in the direction of flow of the material 32 offset to the rear, so that the conveying teeth 20 push the material in equal portions over the moisture sensor 22. In view of the fact that, even with unequal lateral loading of the round bale press, there is always material present in the middle of the swathe, the moisture sensor 22 is arranged in the center of the conveying channel base 21, in relation to the width of the conveying channel, as can best be seen from FIG. 2.

The moisture sensor 22 passes from below through an aperture in the conveying channel base 21, which is adapted to the cross-section of the sensor. A sensitive area of the moisture sensor 22 is attached flush to the upper edge of the conveying channel base 21. The moisture sensor 22 is mounted so as to be displaceable in height in the aperture, and is secured in a pot-type mounting 33. The pot-type mounting 33 is secured to the force sensor 23.

The force sensor 23 is securely connected by means of a bracket 35 to the base of the conveying channel 21. The force sensor 23 is designed in such a way that it only detects forces which take effect perpendicular to its surface, but not transverse forces which result from the thrust effect of the conveying rotor 19.

In the area of the moisture sensor 22, three compression teeth 36, V-shaped when seen in a side view, engage from the front beneath the carrier tube 37 of the conveying teeth 20 and between adjacent conveying teeth 20 in the conveying channel 18, which in finger fashion press the stem or stalk material with additional force onto the moisture sensor 22 and serve as pressing devices 24. The middle section of the conveying rotor 19 above the moisture sensor 22 is not shown in FIG. 2 for the sake of an easy overview. The compression teeth 36 are secured to a transverse tube 38 and mounted so as to pivot on the frame 40 about an axis of rotation 39 located transverse to the direction of travel 10. The compression teeth 36 extend in the direction of flow of material 32 as far as behind the moisture sensor 22. A hydraulic cylinder 41 with joint connection to the frame 40 is connected on the piston rod side to a lever arm 42, which is welded to the transverse tube 38. Connected to the cylinder chamber 43 of the hydraulic cylinder 41, on the piston rod side, is a hydraulic reservoir 44, which holds the compression teeth 36 under preliminary tension in the operating position 46, indicated by the broken line, delimited by a stop 45, and, if required, allows it to be diverted upwards with largely constant force.

Figure 7:
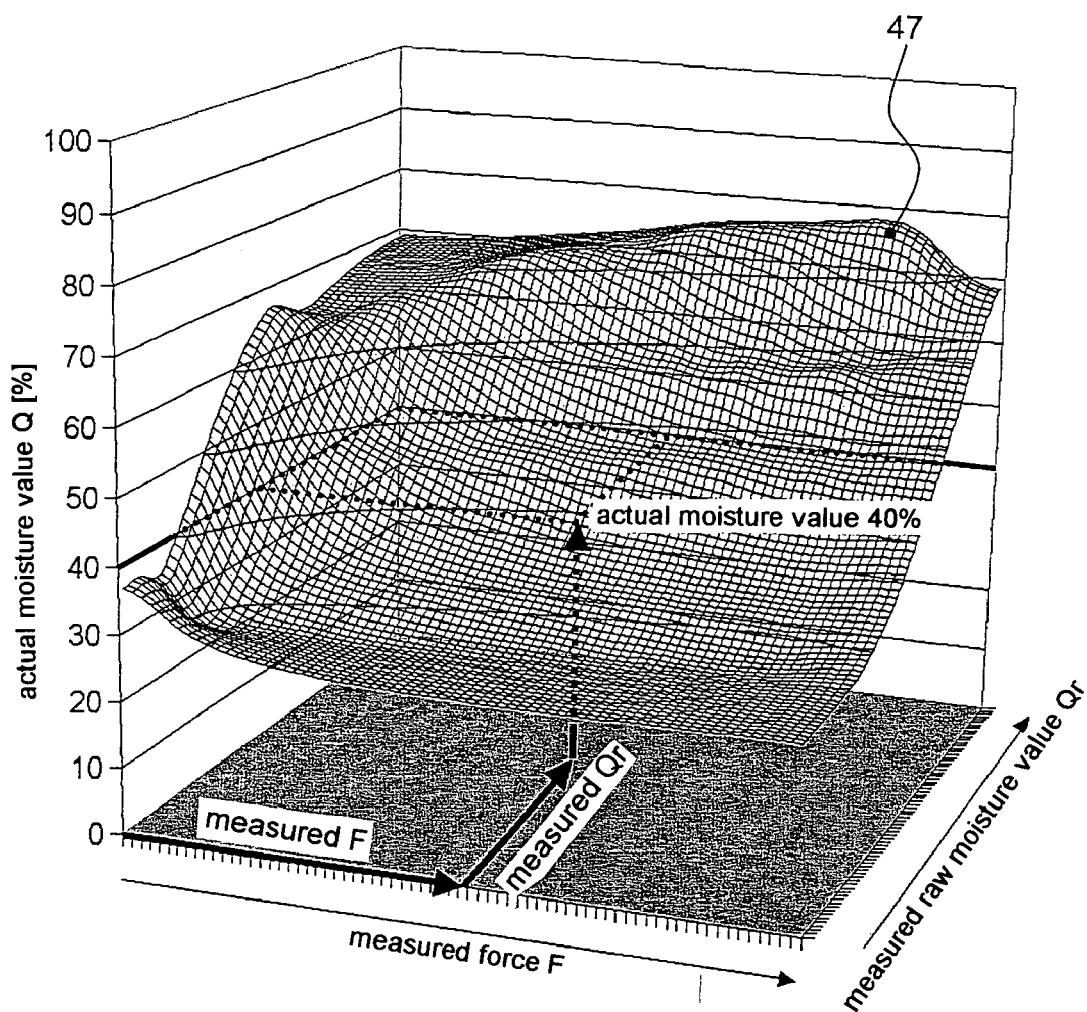
FIG. 7 is by way of example, a calibration surface in three-dimensional space, which is extended on the height axis through the axes of measured compression force values and measured raw moisture content values in the plane and actual moisture values according to laboratory experiments.

Deposited in the control unit 25 is at least one calibration surface 47, represented in FIG. 7, for example, for wilted grass.

The calibration surface 47 is material-dependent. To adjust the calibration surface, material samples of equal moisture content are compressed in tests with different forces, and in each case the raw moisture values associated with these forces are measured. From this is derived a moisture raw value calibration curve, as a function of the compression force, to which the actual moisture values are allocated, from drying cabinet measurement of the samples. The calibration surface 47 is then derived by the allocation of the actual moisture value to the measured raw moisture value Qr and to the measured compression force value F in the three-dimensional space, which is extended by these three values. In order to make do with only a few laboratory measurements, the calibration surface 47 is formed from measured and calculated moisture values from among those measured.

The compiling round bale press represented is drawn by a tractor on the field over a swath of stem or stalk material, which is taken up by the pick-up drum 17 rotating in the direction of the arrow 48, and is conveyed by means of the conveying rotor 19 through the delivery aperture 16 into the compression chamber 11. In this situation the material is pressed by the compression teeth 36 with additional force against the moisture sensor 22. The compression force is adjustable and dependent on the material or the material structure respectively. During the conveying of the stem or stalk material, the moisture sensor 22 and the compression force sensor 23 are constantly receiving measurement signals simultaneously, and passing these to the control unit 25. The evaluation electronics of the control unit 25 compares the measured compression force signals with a predetermined reference compression force value. If this reference compression force value is not reached, no further evaluation of these measured compression force values is effected. The compression force values which exceed the reference compression force are combined with the raw moisture values to form value pairs. By means of these measured value pairs (F, Qr), see FIG. 7, the actual moisture content Q of the stalk or stem material is determined in the calibration surface 47, see height axis FIG. 7, and, after a mean value formation of all the Q values, for example at the end of the bale pressing process, the actual moisture content value is displayed on the operating device 26. As an individual example, an actual material moisture value of 40% for the material concerned is derived from FIG. 7. If required, then of course the current moisture measurement of the stem or stalk material being delivered can be displayed on-line and/or used for GPS mapping of the moisture. Compression forces on the material to be measured that are too low will be signalled to the operator, who, if appropriate, can increase the delivery of the stem or stalk material and/or increase the compression force of the compression teeth 36, which can also be effected automatically.

Figure 3:
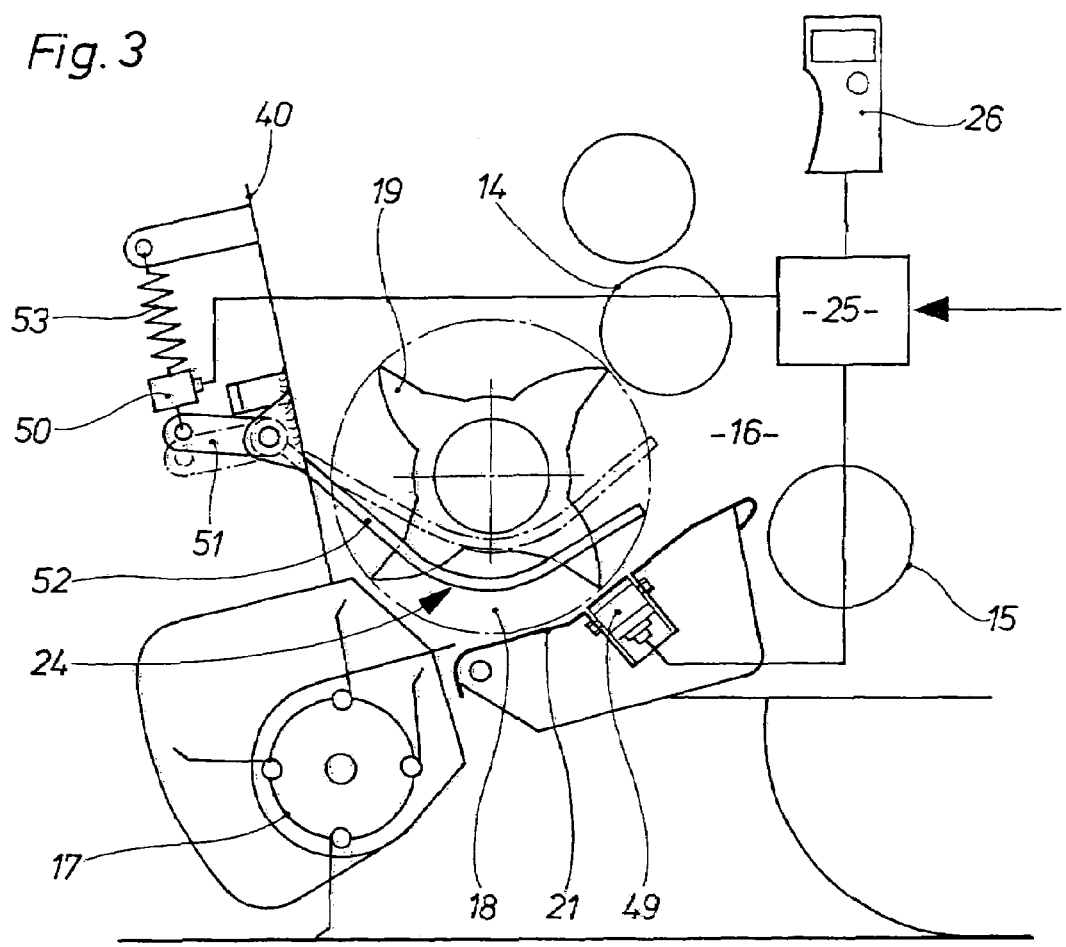
FIG. 3 is a part side view of the front part of a round bale press with a second embodiment of a measuring device.
Figure 2:
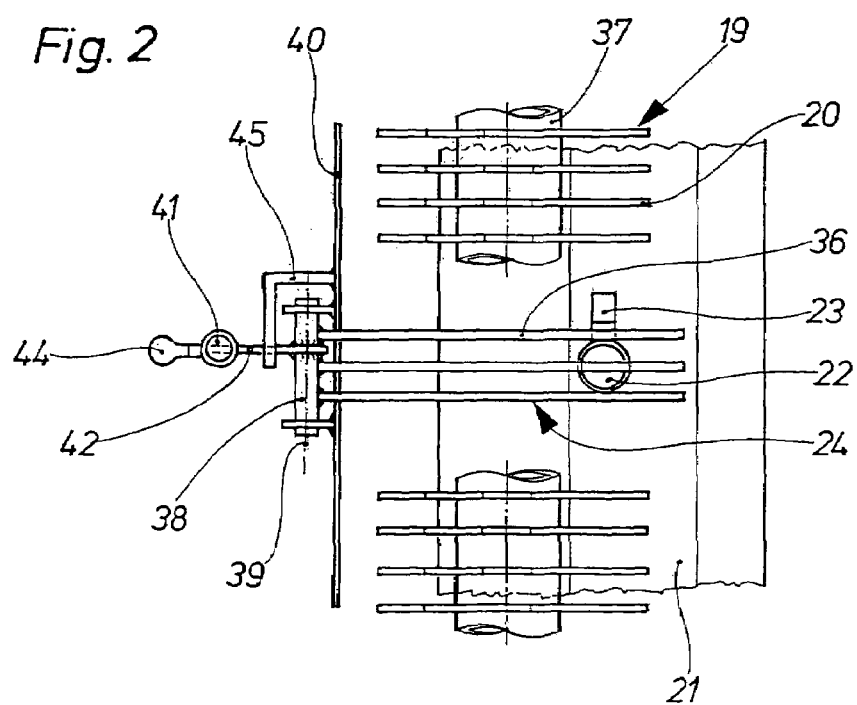
FIG. 2 is a plan view of the measuring device according to FIG. 1, in the direction of view of the arrow A, only the middle area of the conveying channel being represented.

The embodiment shown in FIG. 3 differs from the embodiment according to FIGS. 1 and 2 in that the moisture sensor 49 is connected securely to the conveying channel base 21 and measurement of the compression force is effected by a force measurement box 50, which is arranged at one end of the lever arm 51 of the compression teeth 52, and is connected at the other end to a tension spring 53, which creates the compression force of the compression teeth 52, with which these teeth press the stem or stalk material onto the moisture sensor 49. Otherwise the manner of operation corresponds to the measuring device represented in FIG. 1 and FIG. 2.

Figure 4:
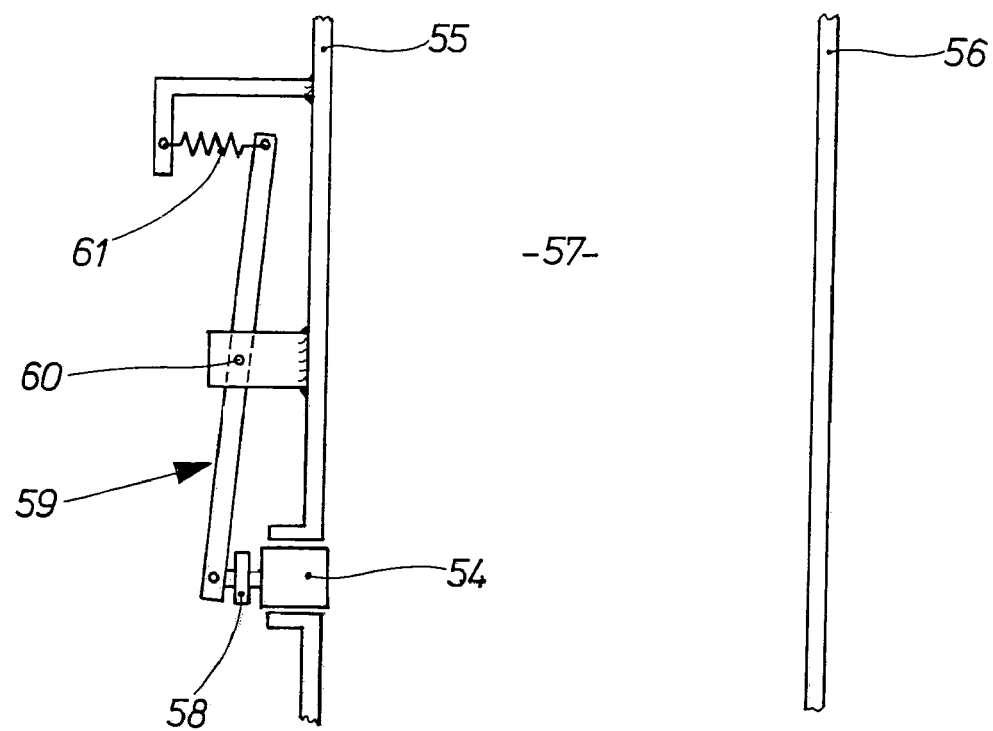
FIG. 4 is a horizontal section through a moisture sensor element arranged in a side wall of a round bale press, in combination with a compression force sensor element.

In the embodiment according to FIG. 4, the moisture sensor 54 is arranged in the side wall 55 of the round bale press or a square bale press, and therefore takes measurements at the compacted bale strand which is located between the side walls 55, 56, and is designated by the reference number 57. The moisture sensor 54 passes through an aperture in the side wall 55, and is mounted in a displaceable manner in the aperture. The moisture sensor 54 is connected by means of a force measurement box 58 to a two-armed lever 59. The two-armed lever 59 is arranged so as to pivot in a bearing 60 arranged on the side wall 55, and connected by means of a tension spring 61 to the end of the lever arm turned away from the moisture sensor 54, said spring pressing the moisture sensor 54 with pre-adjustable force against the bale strand 57. The value pairs (F, Qr) measured by the moisture sensor 54 and by the force measuring box 58 are processed in the same manner as with the embodiments described heretofore.

Since differences in density also pertain in the compacted compressed strand 57 and in the round bales, depending on the filling, the precision of the moisture measurement can be improved considerably by the measuring device and measuring method according to the invention.

Figure 5:
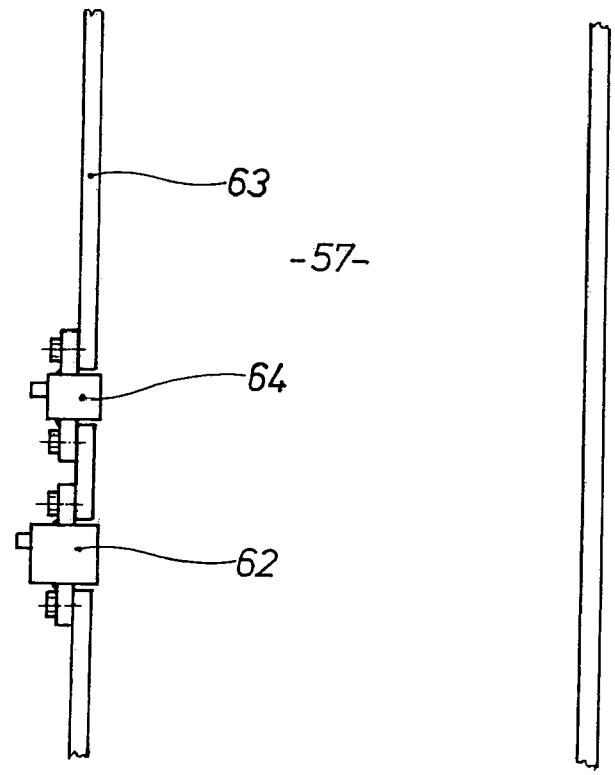
FIGS. 5 and 6 are a view according to FIG. 4, but with other embodiments.

With the embodiment represented in FIG. 5, the moisture sensor 62 passes through a first aperture in the side wall 63, and, in the immediate vicinity of this, a compression force sensor 64 passes through the side wall 63. Both sensors 62, 64 are fastened to the side wall 63. An advantage in this situation is the use of conventional commercial sensors 62, 64, and the simple assembly. A precondition for the function according to the invention, however, is the presence of the same compression circumstances on both sensors 62, 64.

Figure 6:
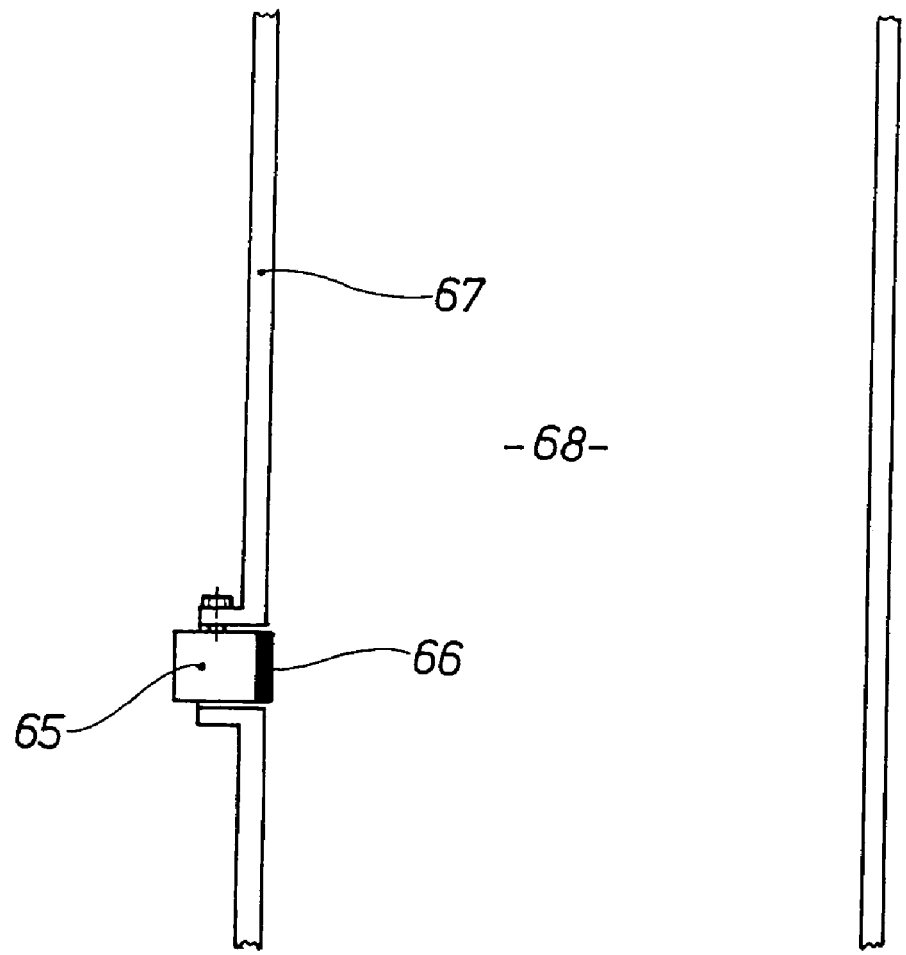

The embodiment illustrated in FIG. 6 shows a moisture sensor 65 with a force-sensitive surface 66, which is securely mounted in the side wall 67, and extends through an aperture of at least the same size into the compression chamber 68 or the compression channel.

The measuring devices according to the invention can therefore be used without restriction at all desired measuring points of a harvesting machine, and on unprocessed harvested material as well as on the finished product (bales). In addition to this, however, an embodiment is also possible as a hand-held measuring device with its own energy supply, so that even loose bulk material or non-compacted heaps of material can be measured. As compression force, the hand-applied force would be measured by a force detector. On reaching the pre-adjustable compression forces, the moisture measurement evaluation and display is then carried out automatically.

Thus, the invention has been described by reference to certain embodiments discussed above. It will be recognized that these embodiments are susceptible to various modifications and alternative forms well known to those of skill in the art. Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A measuring device for measurement of the moisture content of agricultural harvested materials comprising compactable stalk or stem products, the measuring device comprising:
   a moisture sensor element for measuring a raw moisture value (Qr) of the material;
   a force sensor element for measuring a compression force (F) exerted by the material on the moisture sensor element; and
   a control unit operationally connected to the moisture sensor element and the force sensor element for determining the moisture content on the basis of the raw moisture value and the compression force.

2. The measuring device according to claim 1, wherein the moisture sensor element is supported on the force sensor element.

3. The measuring device according to claim 1, wherein the force sensor element is arranged as a force-sensitive surface on the moisture sensor element.

4. The measuring device according to claim 1, wherein the force sensor element is arranged separately from the moisture sensor element at a measuring point with the same compression conditions as those of the material to be measured at the moisture sensor.

5. The measuring device according to claim 1, wherein the material to be measured is pressed by at least one compression device with additional force directly or indirectly onto the moisture sensor element.

6. The measuring device according to claim 1, wherein the moisture sensor element is designed as a compression device for the material to be measured and is arranged so as to be movable.

7. The measuring device according to claim 5, wherein the compression device comprises compression teeth and the force sensor measures the compression force of the compression teeth on the material to be measured.

8. The measuring device according to claim 5, wherein the compression device exerts a largely constant pressure on the material to be measured.

9. The measuring device according to claim 1, the measuring device being a mobile hand-held measuring device with its own power supply.

10. A mobile agricultural machine for harvesting compactable stalk or stem products comprising:
    a path for harvested material;
    a moisture sensor element located in the path for measuring a raw moisture value (Qr) of the harvested material;
    a force sensor element for measuring a compression force (F) exerted by the harvested material on the moisture sensor element; and
    a control unit operationally connected to the moisture sensor element and the force sensor element for determining an actual moisture content of the harvested material on the basis of the raw moisture value and the compression force.

11. The mobile agricultural harvesting machine according to claim 10, wherein the moisture sensor element is arranged in a conveying channel located downstream of a pick-up drum.

12. The mobile agricultural harvesting machine according to claim 10, wherein the mobile agricultural harvesting machine is a round bale press and the moisture sensor element is arranged in an area of a compression chamber of the round bale press.

13. The mobile agricultural harvesting machine according to claim 10, wherein the mobile agricultural harvesting machine is a ram extruder press and the moisture sensor element is arranged in an area of a preliminary compression channel or a compression channel of the ram extruder press.

14. The mobile agricultural harvesting machine according to claim 13, wherein the force sensor element is combined directly or indirectly with a pressure or density sensor in a preliminary compression channel of the ram extruder press, or is arranged in its immediate vicinity.

15. The mobile agricultural harvesting machine according to claim 10, wherein the control unit has at least one display for displaying the moisture content of the material to be measured.

16. The mobile agricultural harvesting machine according to claim 10, wherein the control unit has at least one memory with at least one multi-dimensional calibration function for determining a calibrated moisture measured value (Q) from measured value pairs of raw moisture value (Qr) and compression force (F).

17. The mobile agricultural harvesting machine according to claims 16, wherein for different types or structures of harvested material, different calibration functions are stored, which can be pre-selected manually via a man-machine interface or via a further material type sensor or which are accessible automatically.

18. The mobile agricultural harvesting machine according to claim 10, wherein the control unit excludes signals from the moisture sensor element below a predetermined farce measurement value of the force sensor element, so that it can also be identified whether material to be measured is located in the measurement range of the moisture sensor or not.

19. The mobile agricultural harvesting machine according to claim 10, wherein the control unit automatically evaluates sensor signals if predetermined force measurement values of the further sensor element are reached or exceeded.

20. The mobile agricultural harvesting machine according to claim 10, wherein the compression force on the material to be measured can be controlled or regulated as a function of the material properties of the material to be measured or as a function of the compression force measured by a sensor, or can be predetermined by the operator.

21. The mobile agricultural harvesting machine according to claim 10, wherein the moisture sensor element operates in accordance with known moisture measurement processes including conductivity measurement, capacitive measurement, or according to the microwave measurement method.

22. A method for determining the actual moisture content of a material to be measured comprising compactable stalk or stem products, the method comprising:
   measuring a raw moisture value (Qr) of the material to be measured at a point of moisture measurement;
   measuring a compression force (F) of the material to be measured at the point of moisture measurement;
   evaluating the actual moisture content (Q) of the material on the basis of the raw moisture value and the compression force.

23. The method according to claim 22, wherein the actual moisture content is evaluated by means of a multi-dimensional calibration function of raw moisture data and compression data.

24. The method according to claim 23, wherein the multi-dimensional calibration function comprises measured raw moisture values and calculated raw moisture values between those measured values.

25. The method according to claim 24, comprising the establishment of the calibration function, wherein value pairs are allocated to a known moisture content value Q of the material to be measured, the value pairs consisting of the raw moisture value Qr, measured by the moisture sensor and the compression force value (F) measured by the force sensor.

26. The method according to claim 22, wherein the raw moisture value and the compression value are measured simultaneously.

27. The method according to claim 22, further comprising the addition of preservation means to the material as a function of the actual moisture content.

28. The mobile agricultural harvesting machine according to claim 10, wherein the control unit is operationally connected to control operation of the machine on the basis of the actual moisture content.

29. The mobile agricultural harvesting machine according to claim 10, wherein the control unit is operationally connected to control addition of preservation means to the material as a function of the actual moisture content.

* * * * *